(12) United States Patent
Hirokawa

(10) Patent No.: US 7,013,151 B2
(45) Date of Patent: Mar. 14, 2006

(54) PORTABLE TERMINAL DEVICE WITH BUILT-IN GPS

(75) Inventor: Yohei Hirokawa, Tokyo (JP)

(73) Assignee: Nec Corporation, Tokyo (JP)

(*) Notice: Subject to any disclaimer, the term of this patent is extended or adjusted under 35 U.S.C. 154(b) by 510 days.

(21) Appl. No.: 10/309,151

(22) Filed: Dec. 4, 2002

(65) Prior Publication Data

US 2003/0119529 A1 Jun. 26, 2003

(30) Foreign Application Priority Data

Dec. 4, 2001 (JP) ............... 2001-370390

(51) Int. Cl.
H04Q 7/20 (2006.01)
(52) U.S. Cl. ............... 455/456.1; 455/456.2; 455/457; 455/566
(58) Field of Classification Search ............ 455/456.1, 455/456.2, 456.3, 457, 566
See application file for complete search history.

(56) References Cited

U.S. PATENT DOCUMENTS

| | | | |
|---|---|---|---|
| 5,497,149 A | 3/1996 | Fast | |
| 5,541,845 A * | 7/1996 | Klein | 701/207 |
| 5,969,595 A | 10/1999 | Schipper et al. | |
| 6,100,806 A | 8/2000 | Gaukel | |
| 6,292,747 B1 * | 9/2001 | Amro et al. | 701/213 |
| 6,801,763 B1 * | 10/2004 | Elsey et al. | 455/404.1 |
| 2003/0187573 A1 * | 10/2003 | Agnew et al. | 701/201 |

FOREIGN PATENT DOCUMENTS

| | | |
|---|---|---|
| JP | 6-289118 | 10/1994 |
| JP | 10-122895 | 5/1998 |
| JP | 11-241925 | 9/1999 |
| WO | 98/01769 | 1/1998 |
| WO | WO 00/22595 | 4/2000 |

* cited by examiner

Primary Examiner—Temica Beamer
(74) Attorney, Agent, or Firm—Young & Thompson

(57) ABSTRACT

A portable terminal device with built-in GPS (global positioning system) has: a telephone radio part for wirelessly transmitting and receiving latitude information and longitude information; a GPS radio part for receiving data from a GPS satellite; a storage unit for storing the data received in the telephone radio part; a map information part for storing map information; and a control unit for setting the designated movement range of another portable terminal device with built-in GPS on the map stored in the map information part then sending it to the another portable terminal device, and receiving data on the current position of the another portable terminal device to be computed by itself.

16 Claims, 12 Drawing Sheets

PORTABLE TERMINAL DEVICE WITH BUILT-IN GPS

BACKGROUND OF THE INVENTION

1. Field of the Invention

The invention relates to a portable terminal device with built-in GPS (global positioning system) and more particularly to a portable terminal device with built-in GPS of such a type that, when a plurality of persons each carry a portable terminal device with built-in GPS, a first portable terminal device with built-in GPS can set, for example, the designated movement range of a second portable terminal device with built-in GPS and, for the setting contents, the second portable terminal device with built-in GPS can automatically answer the first portable terminal device with built-in GPS.

2. Prior Art

For example, in a portable telephone (a cellular phone), when the power supply is in ON, the portable telephone notifies the base station side of its own position information, i.e., information on the service area in which the portable telephone is located, at predetermined timing. The use of the position information enables a portable telephone network system to grasp information on which portable telephone is located whereabouts on the topography.

In portable telephones, however, the position can be identified only for each cell covered by each base station. Therefore, the obtained position information is merely such that a portable telephone is present within a distance range of several km. There is a system utilizing GPS as a system which can identify the position of the portable telephone with higher accuracy. GPS is a positioning system utilizing military satellites of U.S.A. In this system, 24 GPS satellites each loaded with a precision atomic clock revolve six orbits, wherein four GPS satellites are assigned to each orbit. In GPS, a low-accuracy position information system called "C/A (clear/acquisition) code" has been opened for private purposes. A typical example of a system using C/A code is a car navigation system for automobiles (commonly known as "CARNAVI"). It is known that the use of the C/A code causes a position detection error of several tens of meters to about 100 m. DGPS (differential global positioning system) uses the C/A code and can improve the position accuracy to within about several meters. This DGPS has already been put to practical use.

GPS using the C/A code utilizes four GPS satellites disposed on one orbit and determines a difference, among the three GPS satellites out of the four GPS satellites, in time necessary for radio waves generated from the GPS satellite to reach a receiving point. Based on the time difference, the position is computed using a receiver at the receiving point. In this case, when there is an error between the clocks loaded on the GPS satellites and the clock loaded on the receiver, an error in distance between the three GPS satellites and the receiver occurs. In order to solve this problem, a distance from the fourth GPS satellite is taken into consideration to correct the time error and to provide accurate time. Thus, the positioning system using GPS requires the receipt of data from the four GPS satellites, for computing four variables, latitude, longitude, altitude, and time. The position of the receiving point is indicated in terms of three numerical values representing the latitude, longitude, and altitude, or indicated on a map in the display of the receiver. Specific examples of this system are described, for example, in Japanese Patent Laid-Open Nos. 289118/1994, 122895/1998, and 241925/1999.

In the system disclosed in Japanese Patent Laid-Open No. 289118/1994, each navigation terminal device has a GPS receiving section. A first navigation terminal device in the navigation terminal devices receives a coordinate position of a second navigation terminal device through a portable telephone network and simultaneously indicates, on an identical screen, its own coordinate position and the coordinate position of the second GPS terminal device. According to this construction, the positional relationship between coordinate positions of the plurality of navigation terminal devices can be visually grasped. This can be utilized in positioning of each person when several persons or a group of persons move together, or in the prevention of missing of children.

In the system described in Japanese Patent Laid-Open No. 122895/1998, a searching device has a communication function of PHS system and a positioning function of GPS. The searching device comprises a combination of a master telephone set and a slave telephone set. The position of the master telephone set and the position of the slave telephone set are indicated on a display of the master telephone set. The master telephone set and the slave telephone set together establish DGPS to improve the positional accuracy. According to this construction, even when a poriomania person or a victim, who carries the slave telephone set, is away from a searcher who carries the master telephone set, the position of the slave telephone set can be accurately located even though the person is in the crowd.

The system disclosed in Japanese Patent Laid-Open No. 241925/1999 comprises a management device, which is carried by a tour conductor or the like and a portable navigation device which is carried by tourists or the like. Information on places unsuitable for sightseeing, expected dangerous places, etc. is previously stored in the management device. The portable navigation device periodically acquires position information by GPS and sends this position information to the management device. As soon as the management device has judged that the current position of the portable navigation device is within or is close to the prescribed place or area stored in the management device, the management device sends, to the portable navigation device, an inhibit signal for stoppage of the entry into or approach to that area. This can prevent the person, who carries the portable navigation device, from being exposed to danger.

The conventional portable terminal devices with built-in GPS, however, have the following problems.

(1) According to the constructions of Japanese Patent Laid-Open Nos. 289118/1994 and 122895/1998, when the searcher (a person who carries a navigation terminal device and wishes to obtain position information from another navigation terminal device, or a person who carries a searching device as the master telephone set) does not have intention of conducting the search, any search is not carried out. Therefore, when a person to be located (a person who carries the another navigation terminal device, or a person who carries the slave telephone set) is in face of an unexpected accident which is a state of emergency, in some cases, the searcher cannot rapidly cope with the state of emergency.

(2) According to the constructions of Japanese Patent Laid-Open Nos. 289118/1994 and 122895/1998, the searcher cannot set the movement range of the person to be located. Therefore, the person to be located can be freely moved without limitation on the movement range, and, when the person to be located is a, person suffering from poriomania, such as old person, or a, child, the position of the person to be located should be always monitored.

According to the construction of Japanese Patent Laid-Open No. 241925/1999, when the person to be located has approached or entered a preset place, alarm can be given to the person to be located who is then placed under restraint. The person to be located, however, can be freely moved to places other than the preset place. According to the construction of Japanese Patent Laid-Open No. 241925/1999, alarm can be given to a person who carries the portable navigation device. Since, however, the communication system is not a public portable telephone network but a private radio system, the person who carries the management device cannot make contact with the person to be located through a telephone. The system is private and thus is not general-purpose one.

(3) In all the above-described conventional techniques, the searcher side cannot be informed of the occurrence of an abnormal state or a change in state of the person to be located, based on the speed of movement of the person to be located. Therefore, upon the occurrence of such a state that, for example, a person is kidnapped and taken away in a car, the searcher cannot grasp this state. If the change in movement speed can be grasped, upon a rapid change in movement speed from the speed of walking to the speed of vehicle, the searcher can recognize the occurrence of an abnormal state based on this change.

SUMMARY OF THE INVENTION

Accordingly, it is an object of the invention to provide a portable terminal device with built-in GPS, in which a first portable terminal device with built-in GPS can set a designated movement range of a person, who carries a second portable terminal device with built-in GPS, and the second portable terminal device with built-in GPS can automatically notify the first portable terminal device with built-in GPS of the deviation of the person to be located from the designated movement range.

It is another object of the invention to provide a portable terminal device with built-in GPS, in which, upon a change in movement speed of a second portable terminal device with built-in GPS by a given value or more, the second portable terminal device with built-in GPS can inform a first portable terminal device with built-in GPS of this fact.

According to the first feature of the invention, a portable terminal device with built-in GPS (global positioning system) comprises: a telephone radio part for wirelessly transmitting and receiving latitude information and longitude information; a GPS radio part for receiving data from a GPS satellite; a storage unit for storing the data received in the telephone radio part; a map information part for storing map information; and a control unit for performing processing such that the designated movement range of another portable terminal device with built-in GPS is set on the map stored in the map information part, data on the set designated movement range are sent to the another portable terminal device with built-in GPS, and data on the current position of the another portable. terminal device with built-in GPS, in which the designated movement range has been set, computed by the another portable terminal device with built-in GPS are received.

According to this construction, when a first portable terminal device with built-in GPS on an administrator side (portable terminal device with built-in GPS on searcher side, parent side or the like) wishes to manage a second portable terminal device with built-in GPS (portable terminal device with built-in GPS on the side of a person to be located, a child side or the like), the first portable terminal device with built-in GPS sets the designated movement range and sends the set data to the second portable terminal device with built-in GPS, whereby the administrator side can freely set the designated movement range of the second portable terminal device with built-in GPS. Further, when the searcher's first portable terminal device with built-in GPS receives data on the current position computed by the second portable terminal device with built-in GPS, the searcher side can grasp the movement of the terminal device on the person to be located and, even when the person to be located has deviated from the designated movement range, can rapidly cope with the deviation of the person to be located from the designated movement range and to prevent the person to be located from being exposed to danger.

According to the second feature of the invention, a portable terminal device with built-in GPS (global positioning system) comprises: a telephone radio part for wirelessly transmitting and receiving latitude information and longitude information; a GPS radio part for receiving data from a GPS (global positioning system) satellite; a storage unit for storing the data received in the telephone radio part; a map information part for storing map information; and a control unit which computes a current position based on data obtained through the GPS radio part and, when the computed current position is deviated from a designated movement range set by another portable terminal device with built-in GPS, sends notification of the deviation from the designated movement range to the another portable terminal device with built-in GPS, and further sends the computed data on the current position to the another portable terminal device with built-in GPS.

According to this construction, when the current position of a second portable terminal device with built-in GPS (terminal device on the side of the person to be located) computed based on GPS data received in the GPS radio part has deviated from the designated movement range set by a first portable terminal device with built-in GPS, the notification of this fact and the computed data on the current position are sent to the first portable terminal device with built-in GPS. Therefore, the first portable terminal device with built-in GPS, which has set the designated movement range of the second portable terminal device with built-in GPS, can learn the deviation of the second portable terminal device with built-in GPS from the designated movement range through the received notification and further can learn the current position of the second portable terminal device with built-in GPS from the received data on the current position. Therefore, it is possible to rapidly cope with the deviation of the person to be located from the designated movement range and to prevent the person to be located from being exposed to danger.

According to the third feature of the invention, a portable terminal device with built-in GPS (global positioning system) comprises: a telephone radio part for wirelessly transmitting and receiving latitude information and longitude information; a GPS radio part for receiving data from a GPS (global positioning system) satellite; a storage unit for storing the data received in the telephone radio part; a map information part for storing map information; and a control unit comprising setting means for setting the designated movement range of another portable terminal device with built-in GPS on the map stored in the map information part and for sending the set designated movement range to the another portable terminal device with built-in GPS, means for acquiring data on the current position of the another portable terminal device with built-in GPS with the designated movement range set therein, the current position having been computed by the another portable terminal device with built-in GPS based on data received from the GPS satellite, means for computing its own current position based on data received from the GPS satellite through the GPS radio part, and means which, when the designated movement range has been set by another portable terminal device with built-in GPS, makes a judgment on whether or not the current position has deviated from the designated movement range.

According to this construction, when the portable terminal device with built-in GPS is carried by the searcher, the searcher can set the designated movement range of the person to be located by using a map read from the map information part and can send the set data to the portable terminal device with built-in GPS on the side of the person to be located. Further, when the portable terminal device with built-in GPS has deviated from the designated movement range set by the searcher's portable terminal device with built-in GPS, the searcher can receive data on the current position of the person to be located from the portable terminal device with built-in GPS on the side of the person to be located. On the other hand, when the portable terminal device with built-in GPS is carried by the person to be located and has judged that its own current position has deviated from the designated movement range set by the searcher side, the notification of this fact and data on the current position of the portable terminal device with built-in GPS on the side of the person to be located can be sent to the searcher's portable terminal device with built-in GPS. Thus, the searcher can set the designated movement range of the person to be located, and the deviation of the person to be located from the designated movement range can be automatically notified to the searcher. Therefore, the searcher can grasp the designated movement range of the person to be located and can rapidly cope with the deviation of the person to be located from the designated movement range and to prevent the person to be located from being exposed from danger.

According to the fourth feature of the invention, a portable terminal device with built-in GPS (global positioning system) comprises: a telephone radio part for wirelessly transmitting and receiving latitude information and longitude information; a GPS radio part for receiving data from a GPS (global positioning system) satellite; a storage unit for storing the data received in the telephone radio part; and a control unit comprising setting means for setting the designated movement range of another portable terminal device with built-in GPS on a map downloaded, through the portable telephone radio part, from a position information server for providing map information and for sending the set designated movement range to the another portable terminal device with built-in GPS, means for undergoing setting of the designated movement range by another portable terminal device with builtin GPS, means for acquiring data on the current position of the another portable terminal device with built-in GPS with the designated movement range set therein, the current position having been computed by the another portable terminal device with built-in GPS based on data received from the GPS satellite, means for computing its own current position based on data received from the GPS satellite through the GPS radio part, and judgment means which, when the designated movement range has been set by another portable terminal device with built-in GPS, makes a judgment on whether or not the current position has deviated from the designated movement range.

Processing according to this construction of the portable terminal device with built-in GPS in the fourth feature of the invention is the same as processing according to the construction of the portable terminal device with built-in GPS in the third feature of the invention, except that, in the fourth feature of the invention, instead of the provision of the map information in each of the portable terminal devices with built-in GPS, the map information is downloaded from a position information server. Therefore, the searcher can set the designated movement range of the person to be located, and the deviation of the person to be located from the designated movement range can be automatically informed to the searcher. Therefore, the searcher can grasp the designated movement range of the person to be located and thus can rapidly cope with the deviation of the person to be located from the designated movement range and can prevent the person to be located from being exposed to danger. Further, what is required of each portable terminal device with built-in GPS is only to download map information in its necessary portion. This can reduce the necessary memory capacity in the portable terminal device with built-in GPS and thus can reduce cost by a value corresponding to the reduction in the memory capacity.

According to the fifth feature of the invention, a portable terminal device with built-in GPS (global positioning system) comprises: a telephone radio part for wirelessly transmitting and receiving latitude information and longitude information; a GPS radio part for receiving data from a GPS (global positioning system) satellite; a storage unit for storing the data received in the telephone radio part and past current position data; and a control unit comprising means for acquiring data on the current position of another portable terminal device with built-in GPS computed by the another portable terminal device with built-in GPS based on data received from the GPS satellite, means for computing its own current position based on data received from the GPS satellite through the GPS radio part, speed computation means for determining movement speed based on movement distance for each past positioning stored in the storage unit, judgment means for making a judgment on whether or not the movement speed determined by the speed computation means has exceeded a set upper movement speed limit, and means for, when the result of the judgment by the judgment means is that the movement speed has exceeded the upper movement speed limit, informing another portable terminal device with built-in GPS of the fact that the movement speed has exceeded the upper movement speed limit.

According to this construction, when the movement speed of the portable terminal device with built-in GPS on the side of the person to be located has exceeded a preset speed value, the portable terminal device with built-in GPS on the side of the person to be located informs the searcher's portable terminal device with built-in GPS of a significant change in movement speed of the portable terminal device with built-in GPS on the side of the person to be located. According to this construction, even upon the occurrence of a dangerous situation, for example, such a state that a person is kidnapped and taken away in a car, the searcher can rapidly grasp this state. Therefore, for example, crime can be prevented or settled in an early stage.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings. In the following explanation, it is assumed that two portable terminal devices with built-in GPS make a set and that a person who uses one of the two portable terminal devices with built-in GPS is called "searcher," while a person who uses the other portable terminal device with built-in GPS is called "person to be located." Searchers include, for example, tour conductors, persons responsible for protection/supervision, parents, and managers. Persons to be located include, for example, tourists, old persons and children who should be protected, and persons to be managed.

[First Preferred Embodiment]

Figure 1:
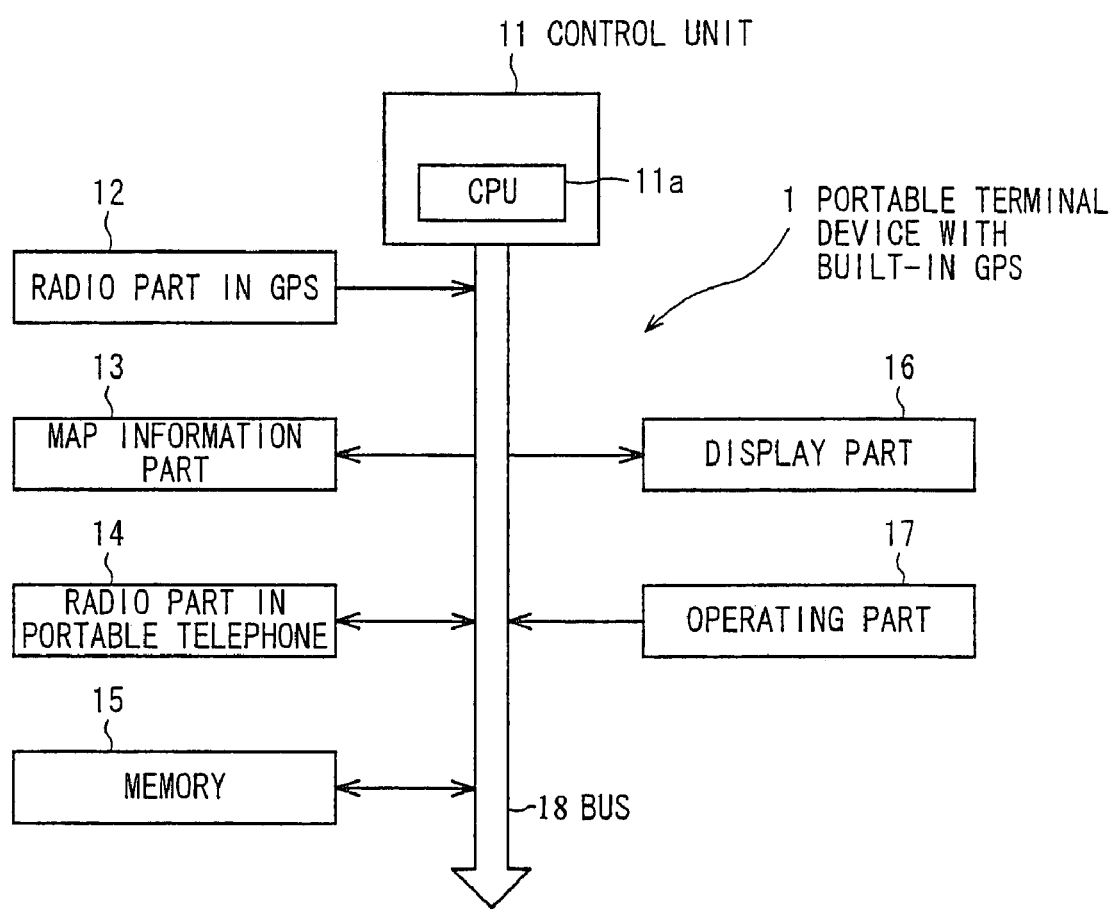
FIG. 1 is a block diagram showing the construction of a portable terminal device with built-in GPS in a first preferred embodiment of the invention.

FIG. 1 is a diagram showing the construction of a portable terminal device with built-in GPS in a first preferred embodiment of the invention. Portable terminal devices with built-in GPS include portable telephones (cellular phones), PHSs (personal handyphone systems), and PDA (personal digital assistants) with a telephone function.

A portable terminal device 1 with built-in GPS may be carried by a person to be located or a searcher. In this case, the portable terminal device 1 with built-in GPS to be carried by the person to be located has the same structure as the portable terminal device 1 with built-in GPS to be carried by the searcher. Specifically, the portable terminal device 1 with built-in GPS comprises: a control unit 11 provided with CPU 11a operated according to a program; a GPS radio part 12 which receives radio waves from GPS satellites; a map information part 13 for storing map information; a portable telephone radio part 14 which wirelessly communicates with a portable telephone network; a memory 15 (a storage unit) for storing data on current position and data on designated movement range of the person to be located; a display part 16 comprising a liquid crystal or other display; and an operating part 17 for generating input information according to keying. Each member other than the control unit 11 is connected to the control unit 11 through a bus 18.

When a person to be located carries the portable terminal device 1 with built-in GPS, map information on a movement range, in which the person to be located can be freely moved, designated by the searcher's GPS terminal is received by the portable terminal device 1 with built-in GPS through the portable telephone radio part 14 from the searcher's GPS terminal and is stored in the memory 15. The designated movement range is set based on the received map information. The current position of the person to be located is identified by receiving data from the GPS satellite through the GPS radio part 12 and computing latitude and longitude based on the received data in the control unit 11. The current position of the person to be located is stored in the memory 15. The control unit 11 reads the designated movement range from the memory 15 and makes a judgment on whether or not the current position is deviated from the designated movement range, or on whether or not the current position is close to the periphery of the designated movement range. Strictly speaking, the current position of the person to be located is the current position of the portable terminal device with built-in GPS on the side of the person to be located. For convenience, however, the current position of the portable terminal device with built-in GPS on the side of the person to be located will be hereinafter referred to as the current position of the person to be located. Likewise, on the searcher side, the current position of the searcher's portable terminal device will be hereinafter referred to as the current position of the searcher. When the result of the judgment is that the current position of the person to be located is within the designated movement range, the receipt of GPS radio waves is started after a given time to again locate the position of the person to be located. On the other hand, when the current position of the person to be located is close to the periphery of the designated movement range, positioning is again started. In this case, positioning intervals are shortened, and, further, information on the current position is superimposed on map information stored in the map information part 13, followed by display on the display part 16. When the current position of the person to be located is outside the designated movement range, the portable telephone radio part 14 sends information on latitude and information on longitude of the current position and an alarm signal to the searcher's portable terminal device with built-in GPS (hereinafter often referred to as "searcher-side terminal device" or "searcher's terminal device") through a portable telephone network. Thereafter, positioning is carried out at given time intervals, and, on all such occasions, information on latitude and information on longitude of the current position are sent to the searcher's terminal device.

Figure 2:
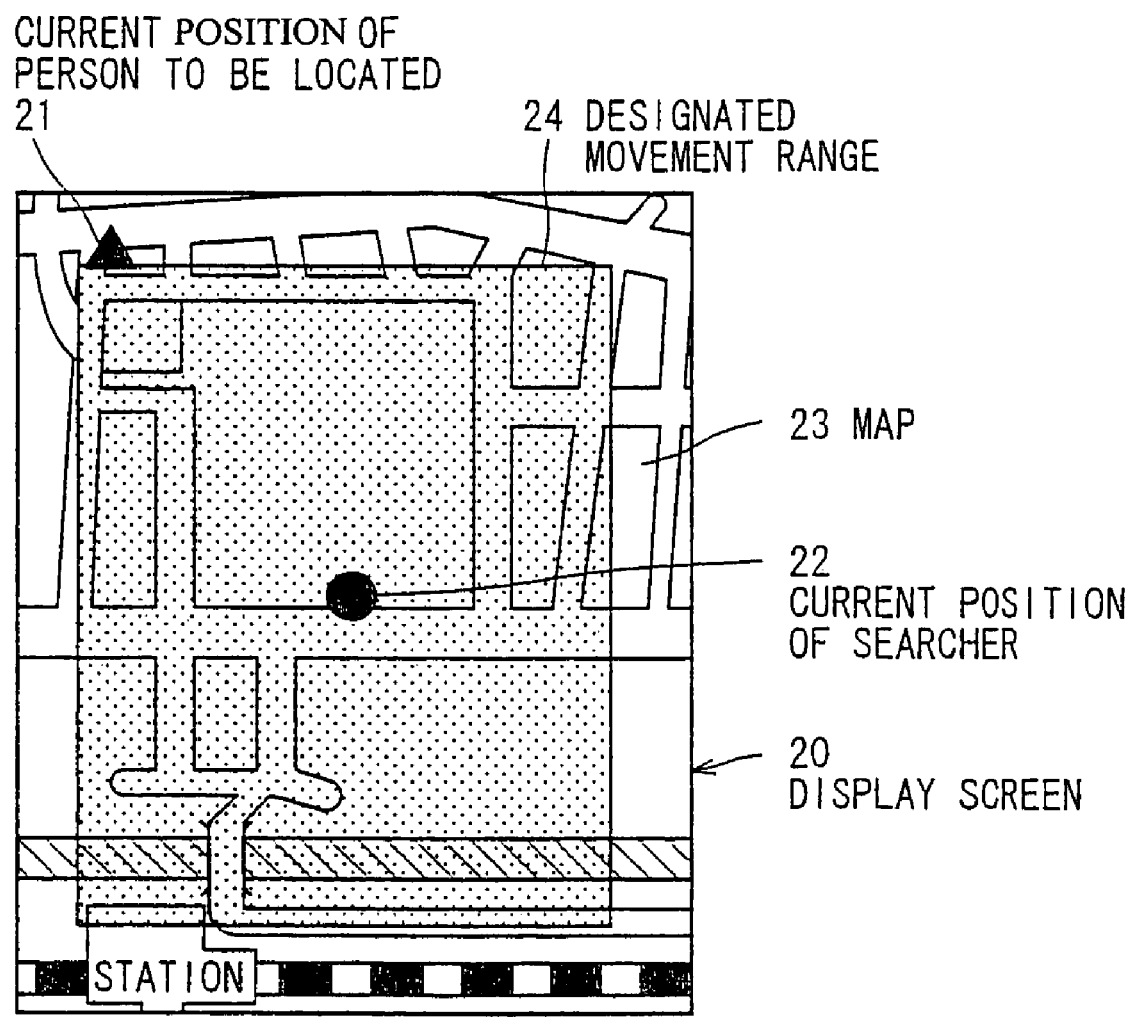
FIG. 2 is a diagram showing a display screen of the portable terminal device with built-in GPS according to the invention, on which a map, a current position, and a designated movement range have been displayed.

Thus, the searcher reads the map on the searcher's terminal device and sets the designated movement range of the person to be located. When it has been found, based on information on position provided by GPS, that the current position of the person to be located is outside the designated movement range of the person to be located, this fact is immediately automatically informed to the searcher's terminal device. Therefore, regardless of the searcher's search, the deviation of the person to be located from the designated movement range can be notified to the searcher. At the same time, as shown in FIG. 2, the current position of the person to be located 21 (▲) and the searcher's own current position 22 (●) are displayed on a map 23 on the display screen 20 in the display part 16 of the searcher's terminal device. Numeral 24 designates a designated movement range which is displayed by staining (color identification), halftone dot meshing or the like so as to be easily recognizable. The current position 21 of the person to be located and the current position 22 of the searcher are updated at given time intervals. This permits the searcher to automatically properly grasp the movement of the person to be located without calling the portable terminal device with built-in GPS on the side of the person to be located (hereinafter often referred to as "terminal device on the side of the person to be located"). As a result, whether or not the person to be located has been deviated from the designated movement range 24 can be reliably recognized. Further, since the designated movement range 24 can be set by making reference to the map, for example, correction of and addition to the designated movement range 24 can be easily carried out based on information obtained on the spot. When positioning shows that the current position of the person to be located is close to the periphery of the designated movement range 24 although the position is still within the designated movement range 24, positioning intervals can be shortened to reduce the time lag of the notification to the searcher.

Figure 3:
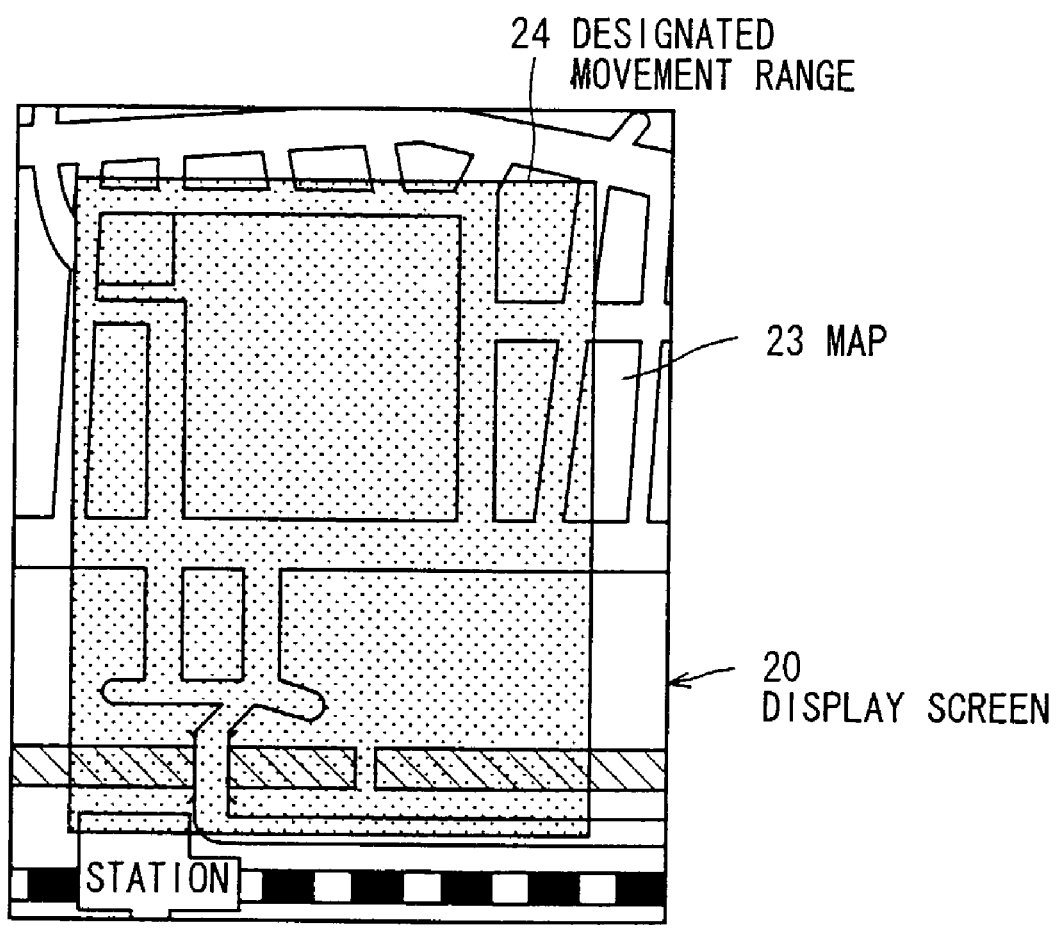
FIG. 3 is a diagram showing a display screen of the portable terminal device with built-in GPS according to the invention, on which only a map and a designated movement range have been displayed.

Next, an embodiment, wherein the searcher uses the portable terminal device 1 with built-in GPS, will be explained. Since map information is stored in the map information part 13, the designated movement range 24 of the person to be located can be set as shown in FIG. 3. The information on the set designated movement range 24 can be sent through the portable telephone radio part 14 to the person to be located. When the terminal device on the side of the person to be located has been deviated from the designated movement range 24, information on latitude and information on longitude can be received through the portable telephone radio part 14. The information on latitude and the information on longitude are stored in the memory 15 on the searcher's terminal device. Further, also on the searcher's side, the GPS radio part 12 receives radio waves from the GPS satellite, and data on the latitude and the longitude are computed in the control unit 11 to identify the searcher's current position 22 which is stored in the memory 15. The stored information on the current positions 21 and 22 are displayed, on the display part 16, in the state of superimposition on a map read from the map information part 13 in the searcher's terminal device. After the person to be located has once deviated from the designated movement range 24, data on the latitude and the longitude are received at given time intervals from the terminal device on the side of the person to be located. Therefore, on all such occasions, in the searcher's terminal device, positioning is carried out to locate the current position 22, and a scale map as displayed on an identical screen in the searcher's portable terminal device with built-in GPS and the portable terminal device with built-in GPS on the side of the person to be located can be displayed on the display part 16.

Figure 4:
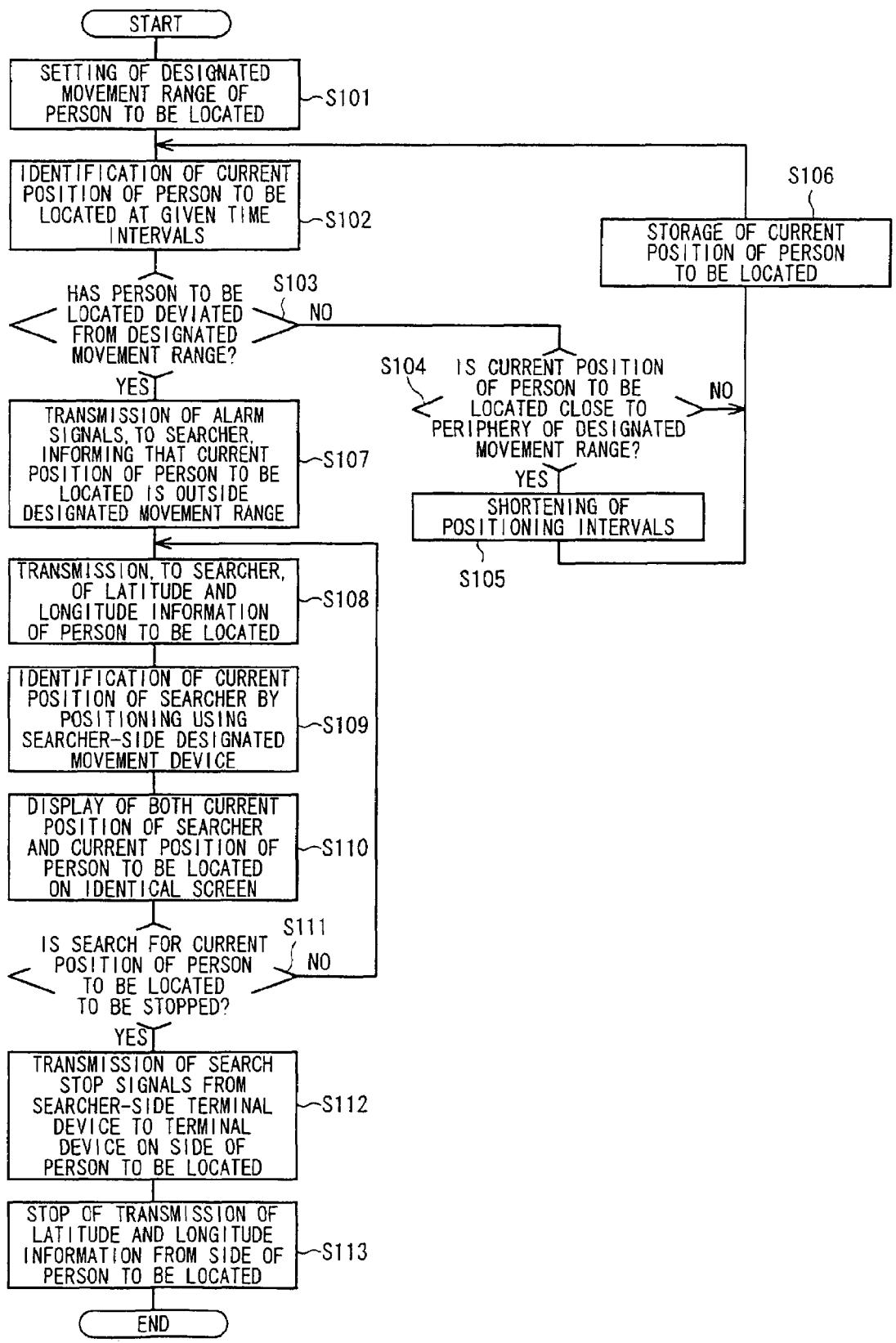
FIG. 4 is a flow chart showing processing by the portable terminal device with built-in GPS shown in FIG. 1.

FIG. 4 shows processing by the portable terminal device with built-in GPS shown in FIG. 1. In the drawing, "S" designates a step. At the outset, the searcher sets a designated movement range 24 in the searcher's terminal device. This set information is sent to the terminal device on the side of the person to be located (S101). In the terminal device on the side of the person to be located in which the designated movement range 24 has been set, radio waves are received from GPS satellites to start positioning and consequently to identify the current position 21 (S102). After the identification of the current position 21 of the person to be located, the terminal device on the side of the person to be located makes a judgment on whether or not the current position 21 is outside the designated movement range 24 (S103) and on whether or not the current position 21 is close to the periphery of the designated movement range 24 (S104). When the result of the judgment is that the current position 21 is within the designated movement range 24 and, at the same time, is not close to the periphery of the designated movement range 24, the current position 21 is displayed (S106) and, after the elapse of a given time period, positioning is again started to again identify the current position 21. On the other hand, when the current position 21 has been judged to be close to the periphery of the designated movement range 24, positioning is again carried out at shortened intervals (S105).

When the result of the judgment is that the current position 21 of the person to be located is outside the designated movement range 24, the terminal device on the side of the person to be located sends an alarm signal to the searcher's terminal device (S107) to inform the searcher of the fact that the person to be located has deviated from the designated movement range 24. Further, the terminal device on the side of the person to be located sends, to the searcher's terminal device, data on latitude and longitude of the current position 21 which is outside the designated movement range 24 and, after the elapse of a given time period, again starts positioning to locate the current position 21 (S108). Upon the receipt of data on the latitude and the longitude on the side of the person to be located, the searcher's terminal device starts positioning to locate its own current position 22 (S109). After the identification, based on data on the latitude and the longitude on the side of the person to be located and data on the latitude and the longitude on the searcher side, the current position of the person to be located and the current position of the searcher are displayed on a proper scale map on an identical screen in the display part 16 on the searcher's terminal device (S110). When the stop of the search for the person to be located is contemplated (S111), a search stop signal is sent from the searcher's terminal device (S112). As soon as the terminal device on the side of the person to be located receives the search stop signal (S113), the search is stopped.

As described above in conjunction with FIG. 4, according to the first preferred embodiment, the searcher can set the designated movement range 24 of the person to be located while making reference to the map displayed on the screen. When the person to be located has deviated from the designated movement range 24, both the current position of the person to be located and the current position of the searcher are immediately indicated on an identical screen in the display part 16 of the searcher's terminal device. Further, an alarm signal is sent to the terminal device on the side of the person to be located. Therefore, the searcher can easily and rapidly grasp the movement of the person to be located, and the person to be located can learn his or her deviation from the designated movement range 24. Furthermore, as is apparent from S104 and S105, when the position of the person to be located is close to the periphery of the designated movement range 24, positioning intervals, that is, monitoring intervals, are shortened. Therefore, the alarm signal can be rapidly sent to prevent the deviation of the person to be located from the designated movement range 24. The portable terminal device with built-in GPS in the first preferred embodiment has the following additional advantage. For example, the portable terminal device with built-in GPS may be used in meeting of certain members at a designated place. When all members have met at a designated place, there is no longer need to perform the search. In this case, what is required for the stop of the search is only to transmit a search stop signal from the searcher's terminal device. This can eliminate the necessity of troublesome operation.

[Second Preferred Embodiment]

Figure 5:
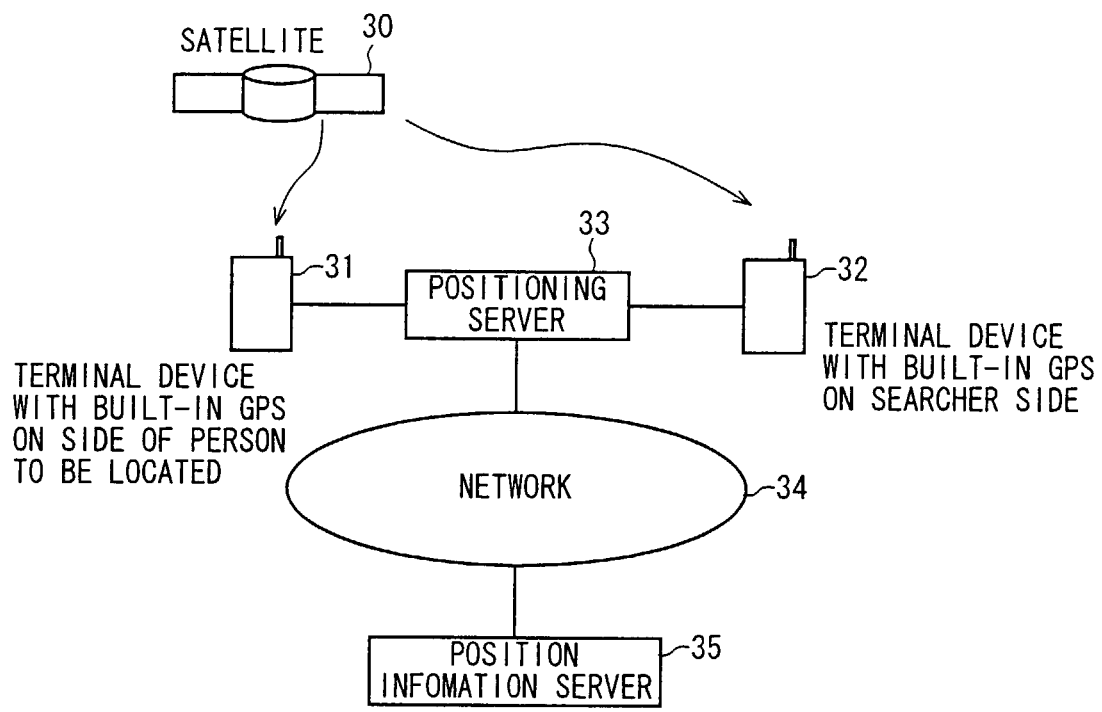
FIG. 5 is a connection diagram showing a portable terminal device with built-in GPS in a second preferred embodiment of the invention.

FIG. 5 shows a portable terminal device with built-in GPS in a second preferred embodiment of the invention.

The characteristic features of the portable terminal device with built-in GPS in the second preferred embodiment of the invention are as follows. Map information is stored neither in the portable terminal device with built-in GPS on the searcher side nor in the portable terminal device with built-in GPS on the side of the person to be located. The map information is stored in a position information server connected to a network, and the map information is sent from this position information server to each of the portable terminal devices with built-in GPS. Further, each portable terminal device with built-in GPS does not perform positioning. The positioning is carried out in a positioning server, connected to the network, based on data received in each of the portable terminal devices with built-in GPS.

As shown in FIG. 5, each of a portable terminal device with built-in GPS 31, which is carried by the person to be located, and a portable terminal device with built-in GPS 32, which is carried by the searcher, receives radio waves from a GPS satellite 30. The portable terminal devices with built-in GPS 31, 32 can be connected to the positioning server 33 through a portable telephone network or the like. The positioning server 33 is connected to the network 34. The position information server 35 storing map information is connected to the network 34. The positioning server 33 computes the latitude and the longitude of the current positions 21, 22 based on data received from the GPS satellite 30 by the portable terminal devices with built-in GPS 31, 32. The network 34 is a conventional network of the Internet. The position information server 35 stores the map information, receives data on latitude and longitude received from the portable terminal device with built-in GPS 31 on the side of the person to be located and the portable terminal device with built-in GPS 32 on the searcher side, and sends a proper scale map.

Figure 6:
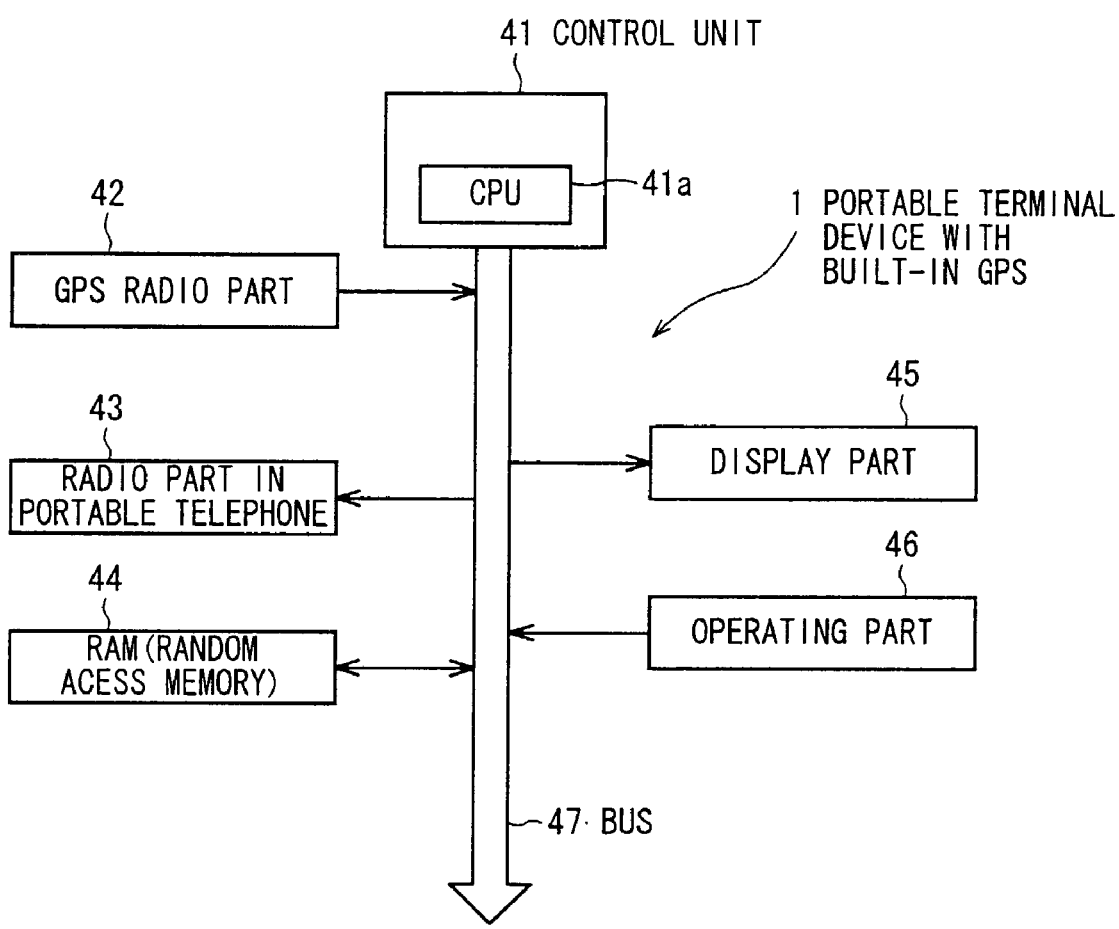
FIG. 6 is a block diagram showing the construction of the portable terminal device with built-in GPS shown in FIG. 5.

FIG. 6 shows the construction of the portable terminal devices with built-in GPS 31, 32.

The portable terminal devices with built-in GPS 31, 32 which are carried by the person to be located and the searcher are identical to each other in construction. The portable terminal device with built-in GPS comprises: a control unit 41 provided with CPU 41a which operates according to a program; a GPS radio part 42 for receiving radio waves from a GPS satellite; a portable telephone radio part 43 which wirelessly communicates with a portable telephone network; RAM 44 for storing a designated movement range 24; a display part 45 provided with a liquid crystal or other display; and an operating part 46 for generating input information according to keying. Each member other than the control unit 41 is connected to the control unit 41 through a bus 47.

In FIGS. 5 and 6, the portable terminal device with built-in GPS 31 on the side of the person to be located receives, from the searcher's portable terminal device with built-in GPS 32, map information including the designated movement range 24 through the portable telephone radio part 43. This map information is stored in RAM 44. Specific processing for identifying the current position 21 in the person to be located will be explained. At the outset, in the portable terminal device with built-in GPS 31, data are received from the GPS satellite 30 through the GPS radio part 42. The received data are sent through the portable telephone radio part 43 in the portable terminal device with built-in GPS 31 toy the positioning server 33. Next, the portable terminal device with built-in GPS 31 is connected by the portable telephone radio part 43 through the portable telephone network (not shown) to the positioning server 33 and receives data on latitude and longitude from the positioning server 33. Thus, the current position 21 of the person to be located is identified. The data on the current position 21 are stored in RAM 44. The control unit 41 in the portable terminal device with built-in GPS 31 reads the designated movement range 24 stored in RAM 44 and makes a judgment on whether or not the current position 21 is within the designated movement range 24. When the result of the judgment is that the current position 21 is within the designated movement range 24, the receipt of radio waves from the GPS satellite 30 is started after the elapse of a given time period to again perform positioning. Further, in this case, the map stored in RAM 44 and the current position 21 are displayed in the state of superimposition on each other on the display part 45. When the current position 21 is outside the designated movement range 24, data on latitude and data on longitude of the current position and an alarm signal are sent to the searcher's portable terminal device with built-in GPS 32. Further, on all occasions of positioning at given time intervals, data on latitude and data on longitude of the current position 22 of the searcher are sent to the portable terminal device with built-in GPS 31 on the side of the person to be located.

The searcher's portable terminal device with built-in GPS 32 downloads map information from the position information server 35 through the built-in portable telephone radio part 43, sets the designated movement range 24 on the downloaded map, and sends data on the designated movement range 24 to the portable terminal device with built-in GPS 31 on the side of the person to be located to set the designated movement range 24 of the person to be located. When the person to be located has deviated from the designated movement range 24, the searcher's portable terminal device with built-in GPS 32 receives an alarm signal and data on latitude and longitude from the positioning server 33 through the portable telephone radio part 43 and stores the data on latitude and longitude of the person to be located in RAM 44 in the portable terminal device with built-in GPS 32. At the same time, as with the portable terminal device with built-in GPS 31 on the side of the person to be located, the portable terminal device with built-in GPS 32 receives GPS data from the GPS satellite through the built-in GPS radio part 42 and starts positioning. The searcher's portable terminal device with built-in GPS 32 sends the received GPS data to the positioning server 33 through the portable telephone radio part 43. The positioning server 33 computes latitude and longitude to identify the current position 22, and the data on the current position 22 are stored in RAM 44 in the portable terminal device with built-in GPS 32. The portable terminal device with built-in GPS 32 is then connected to the position information server 35, downloads, from the position information server 35, such a map that the current position 21 and the current position 22 stored in RAM 44 in the portable terminal device with built-in GPS 32 can be displayed on an identical screen followed by display of the map on the display part 45. When the person to be located has once deviated from the designated movement range 24, data on latitude and longitude are received from the portable terminal device with built-in GPS 31 at given time intervals. On all such occasions, positioning of the searcher's portable terminal device with built-in GPS is carried out to locate the searcher's current position, and such a proper scale map that the current position of the portable terminal device with built-in GPS on the side of the person to be located and the current position of the searcher's portable terminal device with built-in GPS can be displayed on an identical screen is downloaded, followed by the display of the map on the display part 45.

Figure 7:
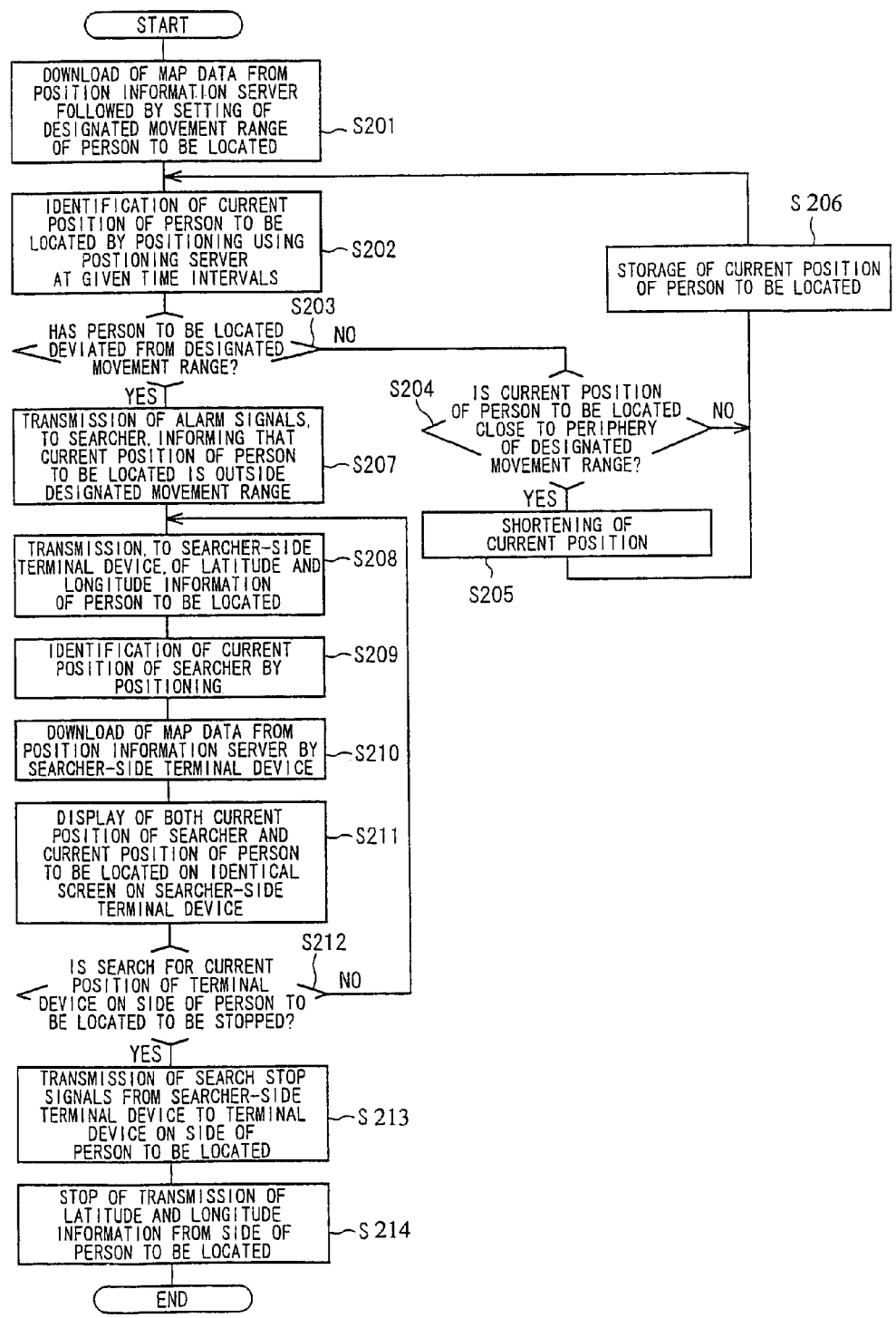
FIG. 7 is a flow chart showing processing by the portable terminal device with built-in GPS in the second preferred embodiment of the invention.

FIG. 7 shows processing by the portable terminal device with built-in GPS in the second preferred embodiment of the invention.

The searcher downloads map information from the position information server 35 through the portable terminal device with built-in GPS 32 and sets, on the map, the designated movement range 24 in which the person to be located can be freely moved. The designated movement range 24 is sent to the portable terminal device with built-in GPS 31 of the person to be located to set the designated movement range 24 in the portable terminal device with built-in GPS 31 (S201). In order to identify the current position 21 of the person to be located, GPS radio waves are received from the GPS satellite 30, and the obtained data are sent to the positioning server 33. The positioning server 33 identifies the current position 21 based on the data on latitude and the data on longitude (S202). After the identification of the current position 21 of the person to be located by the positioning server 33, the portable terminal device with built-in GPS 31 makes a judgment on whether or not the current position 21 of the person to be located is outside the designated movement range 24 (S203). When the result of the judgment is that the current position 21 is within the designated movement range 24 and, at the same time, is not close to the periphery of the designated movement range 24, the portable terminal device with built-in GPS 31 stores the current position 21 in RAM 44 (S206) and, after the elapse of a given time period, starts positioning to again identify the current position 21.

In S204, when the result of the judgment is that the current position 21 is close to the periphery of the designated movement range 24, positioning is started. In this case, positioning intervals are shortened (S205). On the other hand, when the result of the judgment is that the current position 21 of the person to be located is outside the designated movement range 24, the portable terminal device with built-in GPS 31 on the side of the person to be located sends an alarm signal to the searcher's portable terminal device with built-in GPS 32 (S207) to inform the searcher of the deviation of the person to be located from the designated movement range 24. The portable terminal device with built-in GPS 31 on the side of the person to be located sends data on latitude and longitude of the current position 21, deviated from the designated movement range 24, to the searcher's portable terminal device with built-in GPS 32 (S208). After the elapse of a given time period, positioning to identify the current position 21 is again started. Upon the receipt of the data on latitude and longitude of the person to be located, the searcher's portable terminal device with built-in GPS 32 also starts positioning to identify the current position 22 of the searcher (S209). After the identification of the current position 22, such scale map information that both the current position 21 of the person to be located and the current position 22 of the searcher can be displayed on an identical screen is downloaded from the position information server 35 (S210) and is displayed on the display part 45 in the searcher's portable terminal device with built-in GPS 32 (S211). When the stop of the search for the person to be located is contemplated (S212), a search stop signal is sent from the searcher's portable terminal device with built-in GPS 32 to the portable terminal device with built-in GPS 31 (S213). As soon as the portable terminal device with built-in GPS 31 on the side of the person to be located receives the search stop signal (S214), the search is stopped.

As is apparent from the foregoing description, according to the second preferred embodiment, map information is stored in the position information server 35. What is required of each portable terminal device with built-in GPS is only to download map information in its necessary portion. This can reduce the necessary memory capacity in the portable terminal device with built-in GPS and thus can reduce cost by a value corresponding to the reduction in the memory capacity. Further, since the latitude and longitude of the current position of each portable terminal device with built-in GPS are computed by the positioning server 33, processing burden on each portable terminal device with built-in GPS can be reduced. This can increase the processing speed and response speed of the portable terminal device with built-in GPS. Therefore, low-speed CPU 41a may be used.

Figure 8:
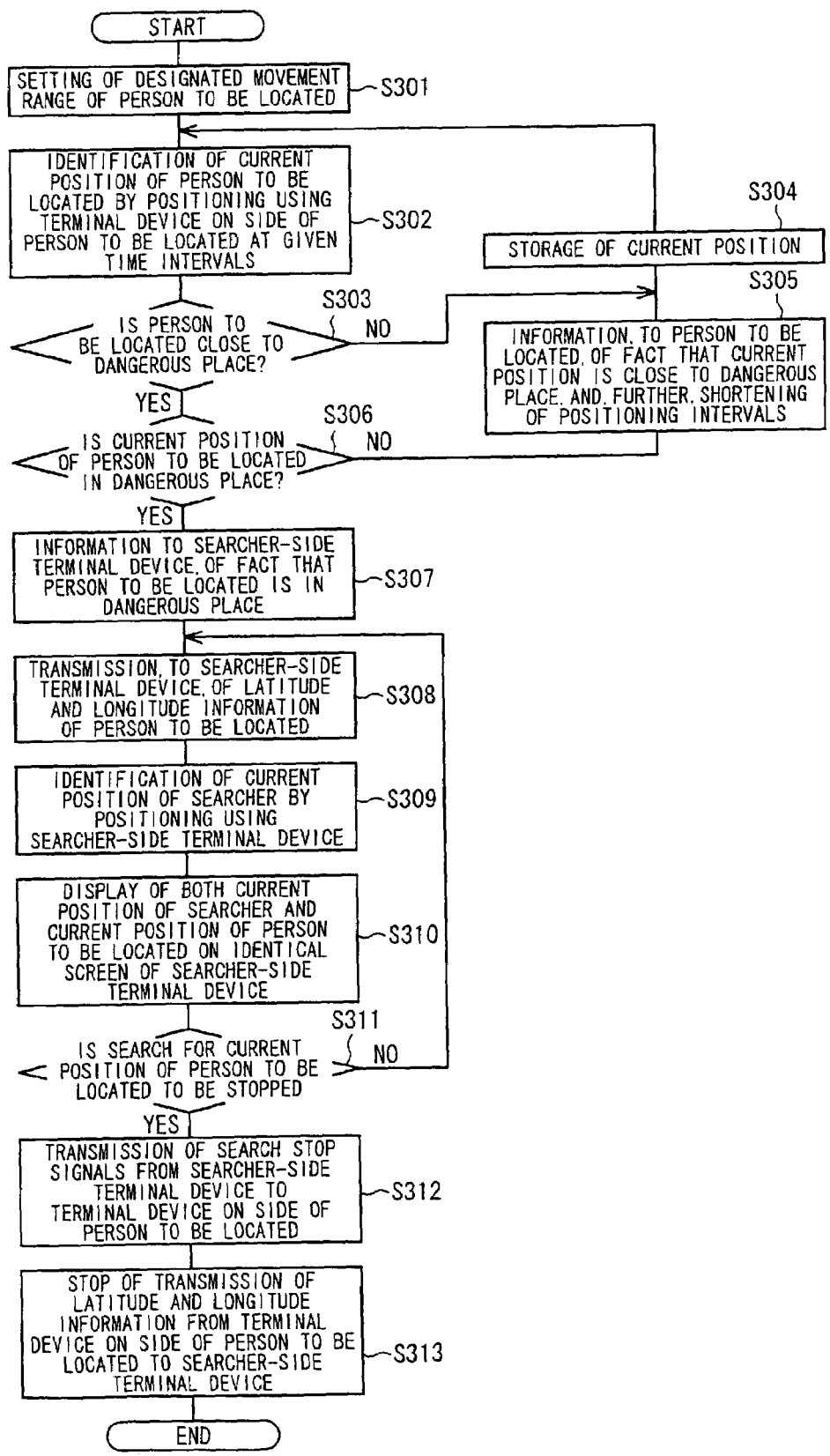
FIG. 8 is a flow chart showing processing by a portable terminal device with built-in GPS in a third preferred embodiment of the invention.
Figure 9:
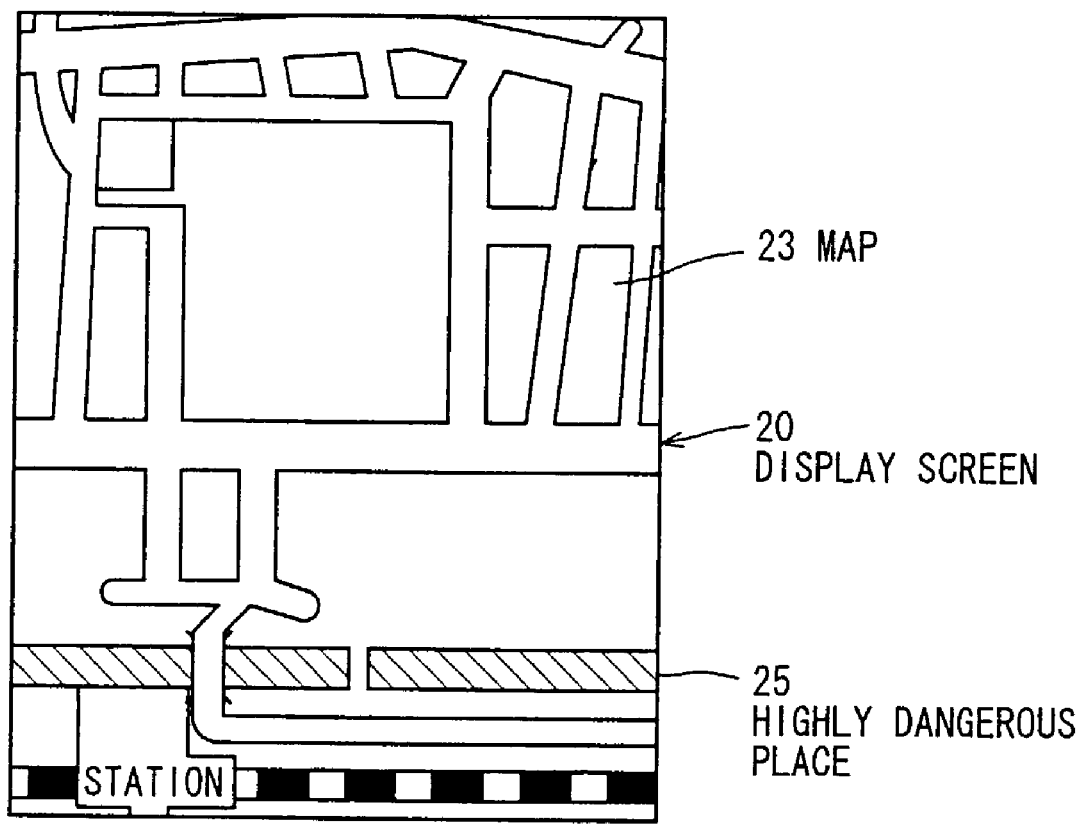
FIG. 9 is a diagram showing the contents of display on a screen of the portable terminal device with built-in GPS in the third preferred embodiment of the invention.

Next, the portable terminal device with built-in GPS in the third preferred embodiment of the invention will be explained. FIG. 8 shows processing by the portable terminal device with built-in GPS in the third preferred embodiment of the invention. FIG. 9 shows the contents of display on a display screen in the portable terminal device with built-in GPS in this preferred embodiment. In this preferred embodiment, the construction of the portable terminal devices with built-in GPS, which are carried by the searcher and the person to be located, is the same as that of the portable terminal device with built-in GPS shown in FIG. 1, except that, in the portable terminal device with built-in GPS in this preferred embodiment, the control unit 11 has an additional function in addition to the function of the portable terminal device with built-in GPS in the first preferred embodiment. The additional function of the portable terminal device with built-in GPS in the third preferred embodiment is to make a judgment on whether the place located by positioning is a dangerous place, a place close to the dangerous place, or a safe place.

When the searcher sets the designated movement range 24 of the person to be located, as shown in FIG. 9, the level of danger is set for buildings, rivers, sea and the like displayed on the map 23. When the current position of the person to be located determined by positioning has been judged by the control unit 11 to be close to a highly dangerous place 25, a warning sound (searcher's voice, electronic sound or the like) is given from the portable terminal device with built-in GPS on the side of the person to be located (terminal device on the side of the person to be located) to the person to be located. Further, positioning intervals are shortened. On the other hand, when the current position of the person to be located determined by positioning has been judged by the control unit 11 to be a highly dangerous place, an alarm is sent to the searcher and, in addition, information on latitude and longitude of the person to be located are sent to the searcher's portable terminal device with built-in GPS, whereby the searcher can confirm the current position of the person to be located.

In FIG. 8, the searcher sets, on the map 23 shown in FIG. 9, the level of danger for specific places in the designated movement range 24 of the person to be located (S301). In order to identify the current position 21, the terminal device on the side of the person to be located receives GPS radio waves from the GPS satellite to start positioning and identifies the current position 21 (S302). After the identification of the current position 21 of the person to be located, the terminal device on the side of the person to be located makes a judgment on whether the current position 21 is a highly dangerous preset place or a place close to the dangerous place (S303). When the result of the judgment is that the current position 21 is a non-dangerous place, the current position 21 is displayed on the display part 16 (S304). After the elapse of a given time period, the terminal device on the side of the person to be located again starts positioning to identify the current position 21. On the other hand, when the result of the judgment is that the current position 21 is close to the dangerous place, a warning sound is given from the terminal device on the side of the person to be located to the person to be located. Thereafter, positioning is carried out at shortened time intervals (S305). When the result of the judgment is that the current position 21 of the person to be located is a highly dangerous place (S306), an alarm signal is sent to the searcher's portable terminal device with built-in GPS (searcher's terminal device) (S307) to inform the searcher of the fact that the current position 21 of the person to be located is a dangerous place. Processing in and after S308 is the same as that in the first preferred embodiment, and, thus, the explanation thereof will be omitted.

Figure 10:
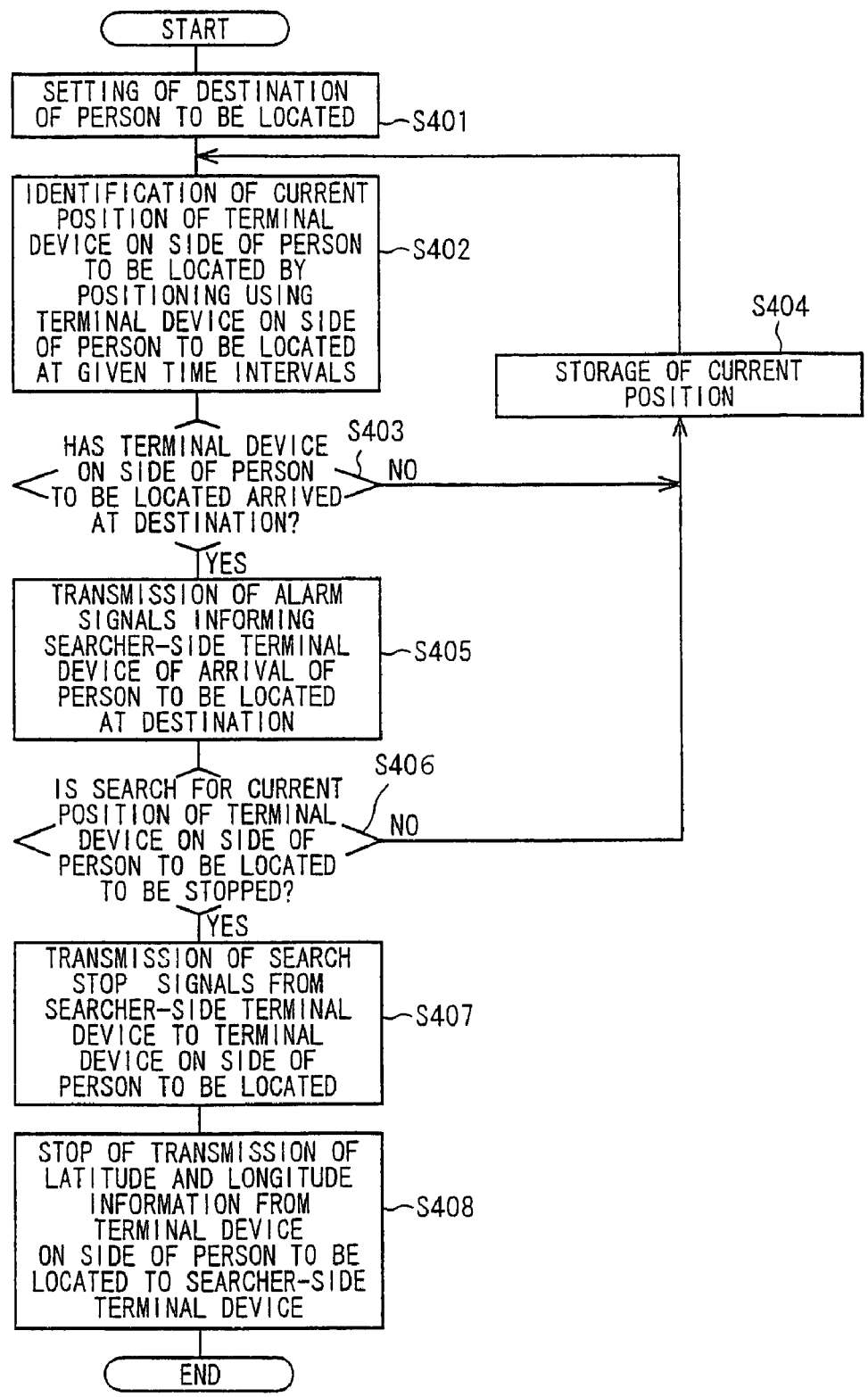
FIG. 10 is a flow chart showing processing by a portable terminal device with built-in GPS in a fourth preferred embodiment of the invention.
Figure 11:
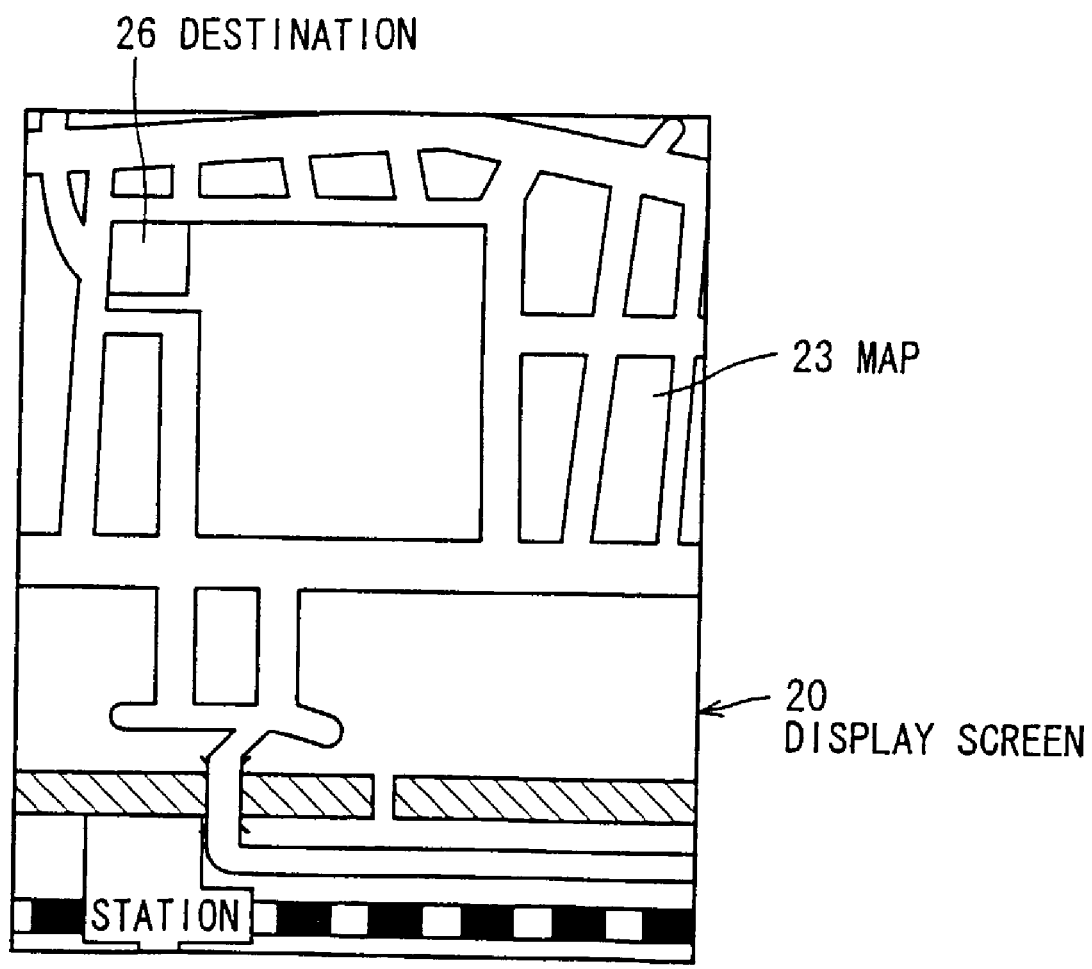
FIG. 11 is a diagram showing the contents of display on a screen of the portable terminal device with built-in GPS in the fourth preferred embodiment of the invention.

Next, the portable terminal device with built-in GPS in the fourth preferred embodiment of the invention will be explained. FIG. 10 shows processing by the portable terminal device with built-in GPS in the fourth preferred embodiment of the invention. FIG. 11 shows the contents of display on a display screen in the portable terminal device with built-in GPS in the fourth preferred embodiment of the invention. Also in this preferred embodiment, the portable terminal devices with built-in GPS, which are carried by the searcher and the person to be located, have the same construction as the portable terminal device with built-in GPS shown in FIG. 1.

In the first preferred embodiment, the designated movement range 24, in which the person to be located can be freely moved, is set. On the other hand, in this preferred embodiment, as shown in FIG. 11, a destination 26 is set. When the person to be located has been found to be in the destination 26 as a result of positioning, a signal is sent to the searcher's terminal device to inform the searcher of the arrival of the person to be located at the destination. According to this preferred embodiment, for example, when a child goes out somewhere, it is possible to confirm whether or not the child could have safely arrived at the destination.

The operation of the portable terminal device with built-in GPS in the fourth preferred embodiment will be explained in conjunction with FIG. 10. The searcher sets, on the searcher's terminal device, the destination 26 of the person to be located, and the set data are sent to the terminal device on the side of the person to be located (S401). The terminal device on the side of the person to be located of which the destination 26 has been set receives radio waves from the GPS satellite to start positioning and identifies the current position 21 (S402). After the identification of the current position 21 of the person to be located, the terminal device on the side of the person to be located makes a judgment on whether or not the current position 21 is the destination 26 (S403) When the result of the judgment is that the current position 21 is not the destination 26, the current position 21 is displayed on the display part 16 (S404). After the elapse of a given time period, the terminal device on the side of the person to be located starts positioning to again identify the current position 21. On the other hand, when the result of the judgment is that the person to be located is in the destination 26, the terminal device on the side of the person to be located sends an alarm signal to the searcher's terminal device (S405) to inform the searcher of the arrival of the person to be located at the destination. When the stop of the search for the current position of the person to be located is contemplated (S406), a search stop signal is sent from the searcher's terminal device to the terminal device on the side of the person to be located (S407). As soon as the terminal device on the side of the person to be located receives this signal, the search is stopped (S408).

Figure 12:
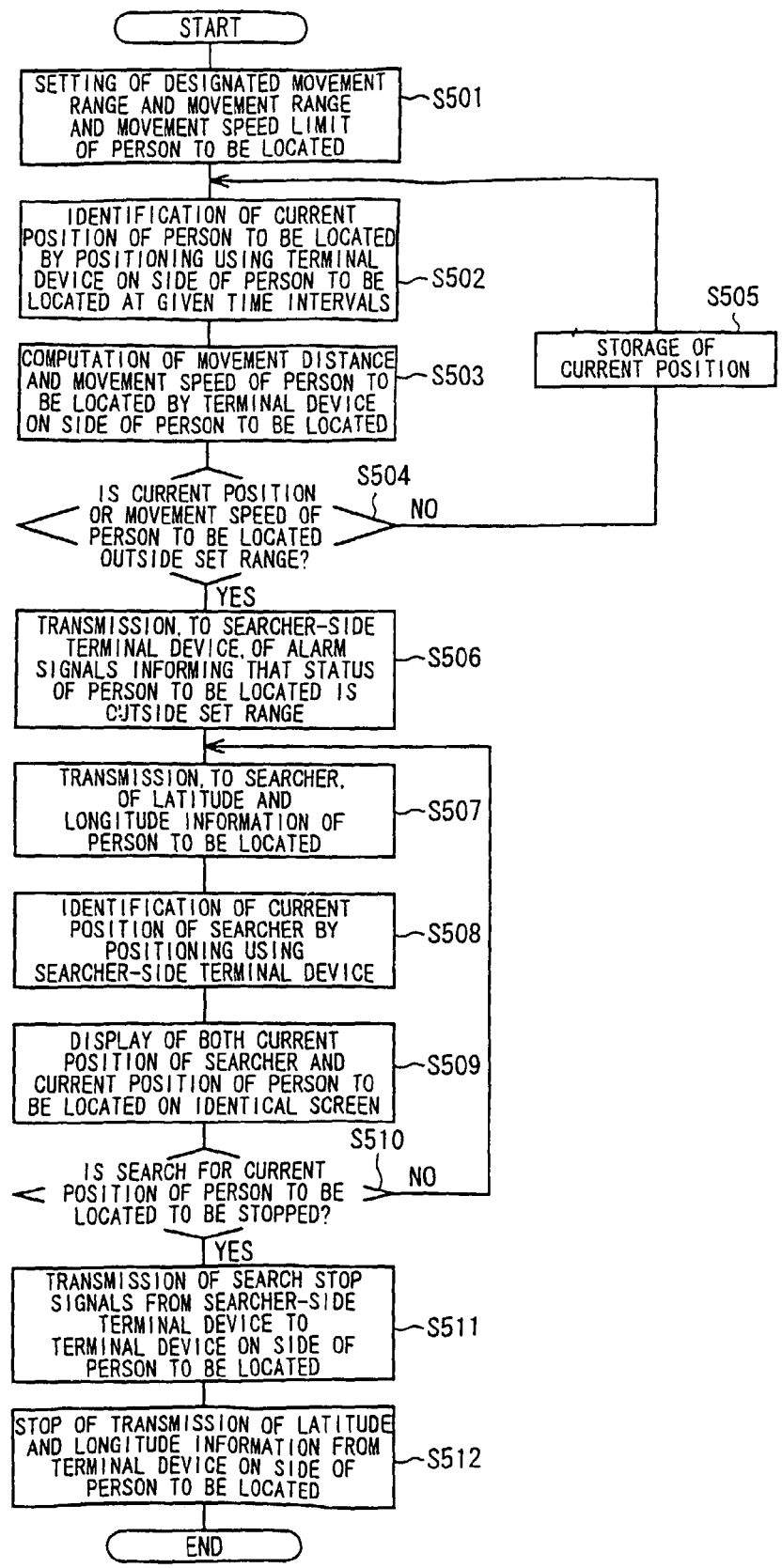
FIG. 12 is a flow chart showing processing by a portable terminal device with built-in GPS in a fifth preferred embodiment of the invention.

Next, the portable terminal device with built-in GPS in the fifth preferred embodiment of the invention will be explained. FIG. 12 shows processing by the portable terminal device with built-in GPS in the fifth preferred embodiment of the invention. The portable terminal device with built-in GPS in the fifth preferred embodiment of the invention is characterized in that, upon the detection of a change in movement speed of the person to be located, this is informed to the searcher side. According to this construction, upon the occurrence of such a state that, for example, a person is kidnapped and taken away in a car, the searcher can grasp this state. For example, upon a rapid change in movement speed of the person to be located from walking speed to vehicle speed, based on this change, the searcher can recognize the occurrence of an abnormal state in the person to be located.

Specifically, when the terminal device on the side of the person to be located has deviated from the designated movement range 24 or when the movement speed of the terminal device on the side of the person to be located has exceeded a given speed, an alarm signal is sent from the terminal device on the side of the person to be located to the searcher's terminal device. Since positioning is carried out by the terminal device on the side of the person to be located at certain constant time intervals, the movement speed of the person to be located can be determined using a distance, computed from the current position 21 identified before a given time and the just identified current position 21, and the positioning interval time. The computation of the movement distance and the movement speed is carried out in the control unit 11.

Next, processing by the portable terminal device with built-in GPS in the fifth preferred embodiment of the invention will be explained in conjunction with FIG. 12. The searcher first sets, on the searcher's terminal device, the designated movement range 24 and the movement speed limit of the person to be located, and the setting data are sent to the terminal device on the side of the person to be located (S501). In order to identify the current position 21, the terminal device on the side of the person to be located receives GPS radio waves from the GPS satellite to start positioning and identifies the current position 21 (S502). After the identification of the current position 21, the movement, distance is computed from the current position 21 before a given time read from the memory 15 and the latest current position 21, and the movement speed of the person to be located is determined from the elapsed time (S503). The terminal device on the side of the person to be located makes a judgment on whether or not the current position 21 is within the designated movement range 24 of the person to be located and on whether or not the movement speed is below the upper movement speed limit (S504). When the result of the judgment is that the current position 21 is within the designated movement range 24 of the person to be located and the movement speed is below the upper movement speed limit, the current position 21 is displayed (S505) and, after the elapse of a given time period, positioning is started to again identify the current position 21. On the other hand, when the result of the judgment is that the current position of the person to be located is outside the designated movement range 24 or that the movement speed is above the upper movement speed limit, the terminal device on the side of the person to be located sends an alarm signal to the searcher's terminal device (S506) to inform the searcher of the fact that the current position of the person to be located is outside the designated movement range 24 or that the movement speed is above the upper movement speed limit. Processing in and after S507 is the same as that in the first preferred embodiment, and, thus, the explanation thereof will be omitted.

In each of the above preferred embodiments, in the setting of the designated movement range 24 of the person to be located by the searcher, the designated movement range 24 is set on the searcher's terminal device, and the set data are then sent to the terminal device on the side of the person to be located. Alternatively, for example, in the case of a group tour in which the tour conductor moves together with the tourists before free activities, during the movement of the tour conductor together with the tourists, the searcher may set the designated movement range of the person to be located directly in the terminal device on the side of the person to be located by operating the terminal device on the side of the person to be located.

In each of the above preferred embodiments, the current position 21 and the current position 22 as shown in FIG. 2 are displayed on a map only in the searcher's terminal device. Alternatively, the same contents may also be displayed in the terminal device on the side of the person to be located. In this case, the searcher's current position 22 is sent from the searcher's terminal device to the terminal device on the side of the person to be located.

In each of the above preferred embodiments, the searcher's portable terminal device with built-in GPS has the same construction as the portable terminal device with built-in GPS on the side of the person to be located. However, specialized portable terminal devices with built-in GPS may be used according to applications.

As is apparent from the foregoing description, the portable terminal device with built-in GPS according to the first feature of the invention can set the designated movement range of another portable terminal device with built-in GPS through a telephone radio part and can receive data on the current position of the another portable terminal device with built-in GPS computed by the another portable terminal device with built-in GPS. Therefore, the searcher side can grasp the movement of the terminal device on the side of the person to be located, and, even when the person to be located has deviated from the designated movement range, it is possible to rapidly cope with the deviation from the designated movement range and to prevent the person to be located from being exposed to danger.

In the portable terminal device with built-in GPS according to the second feature of the invention, when the current position computed based on GPS data received in a GPS radio part has deviated from the designated movement range set by another portable terminal device with built-in GPS, the notification of the deviation from the designated movement range and data on the computed current position are sent to the another portable terminal device with built-in GPS. Therefore, when the portable terminal device with built-in GPS, of which the designated movement range has been set (terminal device on the side of the person to be located), has deviated from the designated movement range, the another portable terminal device with built-in GPS can learn this fact through the received notification and further can learn the current position from the received data on the current position. Therefore, it is possible to rapidly cope with the deviation from the designated movement range and to prevent the person to be located from being exposed to danger.

In the portable terminal device with built-in GPS according to the third feature of the invention, the designated movement range of a person to be located or the like is set on a displayed map. This designated movement range is sent to another portable terminal device with built-in GPS on the side of the person to be located. When the person to be located is about to deviate from the designated movement range, data on the current position of the person to be located are sent to the portable terminal device with built-in GPS (source of setting), which has set the designated movement range of the person to be located, so as to utilize the received data. Thus, the searcher can set the designated movement range of the person to be located. The deviation from the designated movement range can be automatically notified to the searcher so that the searcher can grasp the designated movement range of the person to be located and further can rapidly cope with the deviation of the person to be located from the designated movement range and to prevent the person to be located from being exposed to danger.

In this case, in the portable terminal device with built-in GPS according to the fourth feature of the invention, since the map information is downloaded from a position information server and utilized rather than the provision of the map information in individual portable terminal devices with built-in GPS, the necessary capacity of the memory in the portable terminal device with built-in GPS can be reduced. This can reduce cost by a value corresponding to the reduction in the memory capacity.

In the portable terminal device with built-in GPS according to the fifth feature of the invention, when the portable terminal device with built-in GPS on the side of the person to be located is about to deviate from the designated movement range, or when the movement speed of the portable terminal device with built-in GPS on the side of the person to be located has exceeded a certain given speed, the portable terminal device with built-in GPS on the side of the person to be located informs the searcher's portable terminal device with built-in GPS of this fact. According to this construction, even upon the occurrence of a dangerous situation, for example, such a state that a person is kidnapped and taken away in a car, the searcher can rapidly grasp this state. Therefore, for example, crime can be prevented or settled in an early stage.

The invention has been described in detail with particular reference to preferred embodiments, but it will be understood that variations and modifications can be effected within the scope of the invention as set forth in the appended claims.

What is claimed is:

1. A portable terminal device with built-in GPS, comprising:
   a telephone radio part for wirelessly transmitting and receiving latitude information and longitude information;
   a GPS radio part for receiving data from a GPS (global positioning system) satellite;
   a storage unit for storing the data received in the telephone radio part;
   a map information part for storing map information; and
   a control unit for performing processing such that a designated movement range of another portable terminal device with built-in GPS is set on the map stored in the map information part, data on the designated movement range are sent to said another portable terminal device with built-in GPS, and data on the current position of said another portable terminal device with built-in GPS, in which the designated movement range has been set, computed by said another portable terminal device with built-in GPS are received.

2. The portable terminal device with built-in GPS according to claim 1, wherein, upon the receipt of notification or information from said another portable terminal device with built-in GPS, the control unit identifies its own current position and displays the identified its own current position and the current position of said another portable terminal device with built-in GPS on an identical map.

3. The portable terminal device with built-in GPS according to claim 1, wherein the control unit comprises means which, instead of setting of the designated movement range, sets a movement destination on the map.

4. The portable terminal device with built-in GPS according to claim 1, wherein, in setting the designated movement range, the control unit sets a dangerous place in the map and sends this set information to said another portable terminal device with built-in GPS through the portable telephone radio part.

5. A portable terminal device with built-in GPS, comprising:
a telephone radio part for wirelessly transmitting and receiving latitude information and longitude information;
a GPS radio part for receiving data from a GPS (global positioning system) satellite;
a storage unit for storing the data received in the telephone radio part;
a map information part for storing map information; and
a control unit which computes a current position based on data obtained through the GPS radio part and, when the computed current position is deviated from a designated movement range set by another portable terminal device with built-in GPS, sends notification of the deviation from the designated movement range to said another portable terminal device with built-in GPS, and further sends said computed data on the current position to said another portable terminal device with built-in GPS.

6. The portable terminal device with built-in GPS according to claim 5, wherein, when the computed its own current position is close to the periphery of the designated movement range, the control unit shortens positioning intervals.

7. The portable terminal device with built-in GPS according to claim 5, wherein, when a destination has been set instead of the designated movement range, the control unit, upon the arrival of its own current position at the destination, sends notification of the arrival through the telephone radio part to the source of setting of the destination.

8. The portable terminal device with built-in GPS according to claim 5, wherein, when the located current position has been found to be close to a preset dangerous place, the control unit makes a warning sound and further shortens intervals at which the current position is located.

9. The portable terminal device with built-in GPS according to claim 5, wherein, when its own current position has been found to be close to a preset dangerous place, the control unit informs said another portable terminal device with built-in GPS, which has set the dangerous place, of the approach to the dangerous place.

10. A portable terminal device with built-in GPS, comprising:
a telephone radio part for wirelessly transmitting and receiving latitude information and longitude information;
a GPS radio part for receiving data from a GPS (global positioning system) satellite;
a storage unit for storing the data received in the telephone radio part;
a map information part for storing map information; and
a control unit comprising setting means for setting the designated movement range of another portable terminal device with built-in GPS on the map stored in the map information part and for sending the set designated movement range to said another portable terminal device with built-in GPS, means for acquiring data on the current position of said another portable terminal device with built-in GPS with the designated movement range set, said current position having been computed by said another portable terminal device with built-in GPS based on data received from the GPS satellite, means for computing its own current position based on data received from the GPS satellite through the GPS radio part, and means which, when the designated movement range has been set by another portable terminal device with built-in GPS, makes a judgment on whether or not the current position has deviated from the designated movement range.

11. A portable terminal device with built-in GPS, comprising:
a telephone radio part for wirelessly transmitting and receiving latitude information and longitude information;
a GPS radio part for receiving data from a GPS (global positioning system) satellite;
a storage unit for storing the data received in the telephone radio part; and
a control unit comprising setting means for setting the designated movement range of another portable terminal device with built-in GPS on a map downloaded, through the portable telephone radio part, from a position information server for providing map information and for sending the set designated movement range to said another portable terminal device with built-in GPS, means for undergoing setting of the designated movement range by another portable terminal device with built-in GPS, means for acquiring data on the current position of said another portable terminal device with built-in GPS with the designated movement range set, said current position having been computed by said another portable terminal device with built-in GPS based on data received from the GPS satellite, means for computing its own current position based on data received from the GPS satellite through the GPS radio part, and judgment means which, when the designated movement range has been set by another portable terminal device with built-in GPS, makes a judgment on whether or not the current position has deviated from the designated movement range.

12. The portable terminal device with built-in GPS according to claim 11, wherein the control unit comprises means which, when the computed current position is deviated from the designated movement range set by said another portable terminal device with built-in GPS, sends notification of the deviation from the designated movement range to the source of setting of the designated movement range through the telephone radio part and further automatically sends information on the computed current position.

13. The portable terminal device with built-in GPS according to claim 11, wherein the control unit, when has received notification or information from the terminal device with the designated movement range set therein, identifies its own current position and displays, on an identical map, said identified its own current position and the current position of the terminal device with the designated movement range set therein.

14. The portable terminal device with built-in GPS according to claim 11, wherein every time the control unit has received information on the current position of another portable terminal device with built-in GPS, the control unit performs positioning to locate its own current position and simultaneously displays, on an identical screen, said located its own current position and the current position of said another portable terminal device with built-in GPS.

15. A portable terminal device with built-in GPS, comprising:
 a telephone radio part for wirelessly transmitting and receiving latitude information and longitude information;
 a GPS radio part for receiving data from a GPS (global positioning system) satellite;
 a storage unit for storing the data received in the telephone radio part and past current position data; and
 a control unit comprising means for acquiring data on the current position of another portable terminal device with built-in GPS computed by said another portable terminal device with built-in GPS based on data received from the GPS satellite, means for computing its own current position based on data received from the GPS satellite through the GPS radio part, speed computation means for determining movement speed based on movement distance for each past positioning stored in the storage unit, judgment means for making a judgment on whether or not the movement speed determined by the speed computation means has exceeded a set upper movement speed limit, and means for, when the result of the judgment by the judgment means is that the movement speed has exceeded the upper movement speed limit, informing another portable terminal device with built-in GPS of the fact that the movement speed has exceeded the upper movement speed limit.

16. The portable terminal device with built-in GPS according to claim 15, wherein the control unit, when the movement speed determined by the speed computation means has exceeded the upper movement speed limit, automatically notifies, through the portable telephone radio part, the source of setting of the upper movement speed limit of the fact that the movement speed has exceeded the upper movement speed limit.

\* \* \* \* \*